Jan. 15, 1924.

J. J. REDDICK ET AL 1,481,151

SCALE

Filed July 16, 1919　　2 Sheets-Sheet 1

INVENTORS,
John J. Reddick
Roy Chapman

Jan. 15, 1924. 1,481,151
J. J. REDDICK ET AL
SCALE
Filed July 16, 1919     2 Sheets-Sheet 2
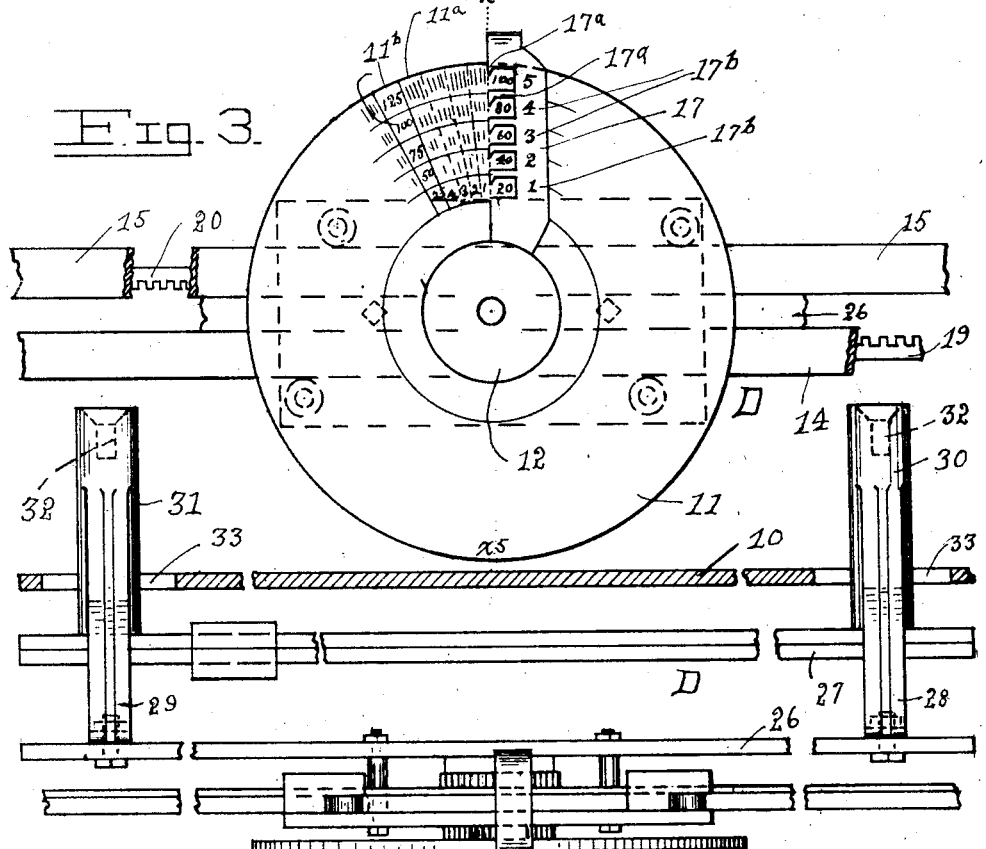
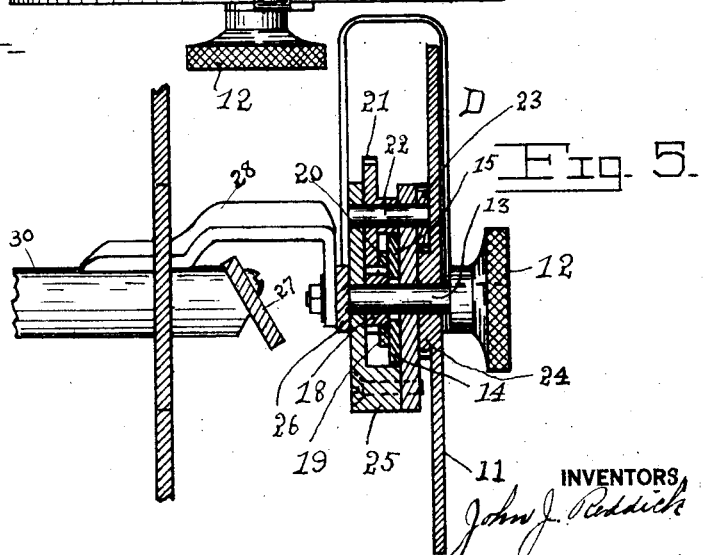
INVENTORS
John J. Reddick
Roy Chapman Patented Jan. 15, 1924.

1,481,151

UNITED STATES PATENT OFFICE.

JOHN J. REDDICK AND ROY CHAPMAN, OF LOS ANGELES, CALIFORNIA, ASSIGNORS TO WILLIAM W. COLWELL, OF LOS ANGELES, CALIFORNIA.

SCALE.

Application filed July 16, 1919. Serial No. 311,133.

*To all whom it may concern:*

Be it known that we, JOHN J. REDDICK and ROY CHAPMAN, both citizens of the United States, and residents of Los Angeles, county of Los Angeles, and State of California, have invented new and useful Improvements in Scales, of which the following is a specification.

This invention relates to scales and it has for its object to provide a scale, or in one form of the invention, an attachment for scales of certain types as ordinarily constructed, whereby the number of small articles in a given mass may be determined and, in the preferred form of the invention, the weight of the mass also determined while on the scale.

In the preferred form the invention comprises a load-receiving member, load weight indicating means, suitable connections and devices (which may be of ordinary or standard construction) between the load-receiving member and the weight indicating means, and a counting mechanism suitably incorporated in the scale or connected with parts thereof whereby, by balancing off the load, which may comprise a great number of articles to be counted and weighed, as by means of a specimen or a number of specimens of such articles, the total number of articles in the mass constituting the load may be determined.

The invention has for a further object the provision of improvements of the character stated which will be superior in point of relative simplicity and inexpensiveness of construction and organization, convenience and facility in installation, operation and control, positiveness in action and reliability and durability, freedon from likelihood to get out of repair, and adaptability to the general conditions of service in connection with which it is to be installed or employed, and which will be generally superior efficiency and serviceability.

With the above and other objects in view, the invention consists in the novel and useful provision, construction, combination, formation and relative arrangement of parts, members and features, all as hereinafter described, shown in the drawings, and finally pointed out in claims.

In the drawings:

Figure 3 is an enlarged fragmentary detail face view of features of the counting mechanism;

Figure 4 is a fragmentary plan view of the showing in Figure 3, the view being taken on the line $x^4$—$x^4$, Figure 1; and Figure 5 is a vertical sectional view taken on the line $x^5$—$x^5$, Figure 3.

Corresponding parts in all the figures are designated by the same reference characters.

Figure 1:
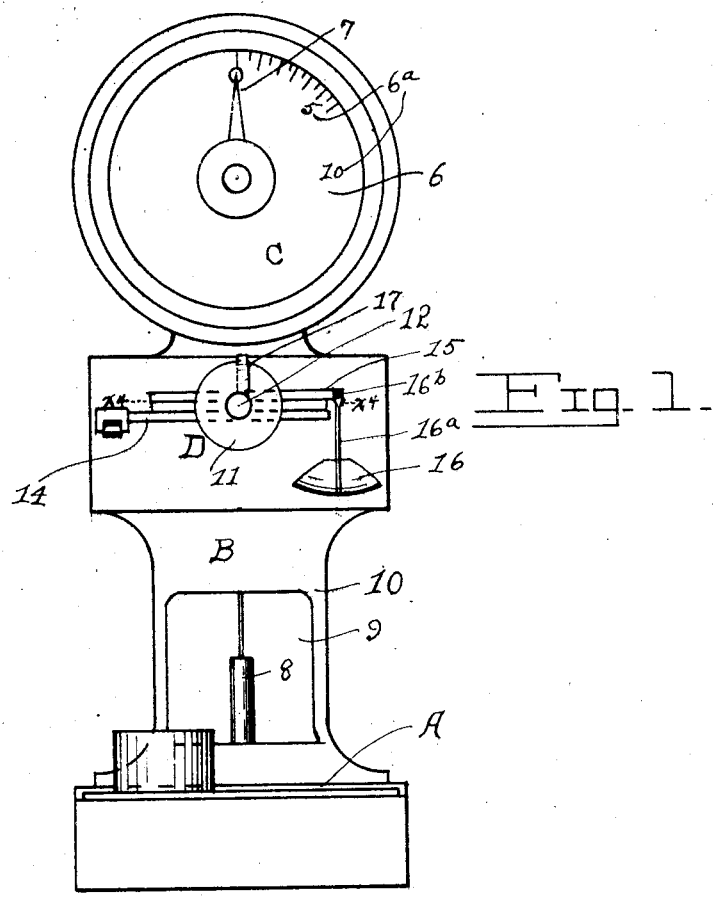
Figure 1 is a front elevation of a scale with an attachable counting device applied thereto.
Figure 2:
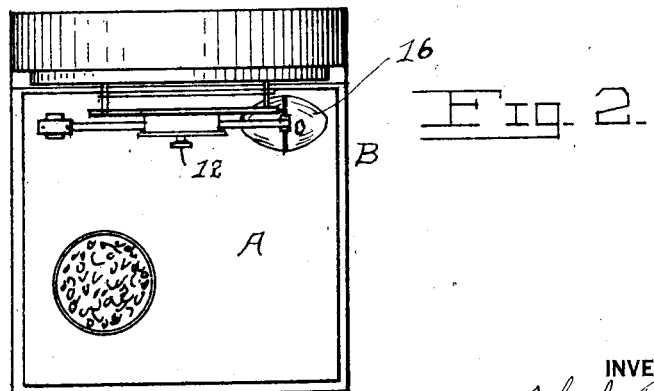
Figure 2 is a plan view of the showing in Figure 1.

Referring with particularly to the drawing, A designates the load-receiving member of a scale B which may be of ordinary or any preferred form, C designates means for indicating the weight of a load placed upon the member A, and D designates means for indicating the number of pieces or articles in the load or mass placed upon the member A.

For clearness of illustration, we have shown a scale of ordinary or well known construction having a load-receiving member or platform A, and weight indicating means C shown as a graduated dial 6 and a pointer 7, it being understood that suitable mechanism, such as is well known to those skilled in the art is provided between the platform, part of such mechanism being shown at 8 in an opening 9 of the scale casing 10. Such mechanism is, according to conventional design, arranged to rotate the pointer 7 to bring the same into registration with the proper numeral of the indicia $6^a$ of the dial 6 to indicate the total weight of a mass placed upon the member A.

The means D is shown as comprising a rotatable dial 11, a rotatable knob 12 knurled at its periphery and fixed to a shaft 13, a counterbalance bar 14, a bar 15 movable oppositely to said bar 14 and carrying a specimen-receiving pan or scoop 16, and means of operative connection between the shaft 13, the bars 14 and 15, and the dial 11, to the end that the bars may be moved by turning the knob 12, and the dial rotated to bring the proper set of indicia thereon into registration with fixed index means shown as a vertically disposed member 17 arranged radially of the dial.

The means of operative connection is shown as comprising a pinion 18 fixed to the shaft 13 and partly lying in the plane of a rack bar 19 fixed to the back of the counterbalance bar 14, and a rack bar 20 fixed to the back of the bar 15. The pinion moves the bars in opposite directions upon rotation of the knob 12. The means of connection further comprises a gear 21 meshing with the pinion 18, and fixed to a shaft 22, which shaft has a pinion 23 fixed thereto just behind the dial and arranged to mesh with a gear 24 fixed to, or made integral with the dial. The shafts 13 and 22 are rotatably mounted in a suitable framework 25, which may be enclosed in a casing (not shown).

Rearward of the framework 25 and secured thereto, is a horizontal bar 26 by means of which the counting mechanism is secured to the tare bar 27, or the supporting means thereof, as by extensions 28 and 29 of horizontal members 30 and 31, respectively, which members are secured to the fulcrum lever of the scale, one at each end thereof, as by means of screws passed into threaded apertures 32 in the ends of the members 30 and 31. The fulcrum lever or other scale feature to which the counter is fixed is not shown in the drawing, as the members 30 and 31 project from the scale casing 10 through apertures 33 provided therein. It will be understood that the shaft 13 is concentric with the fulcrum point or center of rotation of the tare beam and fulcrum lever of the scale.

At the outer end of the bar 14 an adjustable counterweight is provided to the end that the scoop 16 may be balanced off. The scoop 16 is shown as suspended by a connection 16ª from the end of the bar 15, the connection 16ª preferably hanging from suitable wedges 16ᵇ provided one at each side of the bar 15.

The dial 11 is divided off into a plurality of sectors as at 11ª, and suitable numerals 11ᵇ are provided in each sector 11ª, such numerals being read in connection with a series of pointers 17ª of the index member 17 which is shown as a metallic strap bent about the dial from its center at the face thereof to the framework behind the dial. Adjacent each pointer 17ª a numeral 17ᵇ impressed upon the strap, and such numerals are to represent the number of articles placed in the pan 16. The numerals on the dial are to be read in connection with the proper pointer 17, corresponding to the number of articles or pieces in the scoop, as after weighing the mass of articles, shown in a container at A, the mass is balanced off by turning the knob 12 to move the bars 14 and 15 through the gearing, the specimen pieces in the scoop 16 balancing the weight of the mass and bringing the scale pointer back to zero. The numeral directly under the proper pointer 17ª will indicate the number of pieces in the mass, or the division of the respective sector under such pointer will indicate the number of pieces if such number should not be directly represented by a numeral on the dial. A specimen sector showing the preferred form of graduation or indicia arrangement is shown in Figure 3 of the drawing.

Having thus disclosed our invention, we claim and desire to secure by Letters Patent:

1. The combination with a scale having automatic counterbalancing means, of a dial and pointer indicating the weight, a fixed index arranged adjacent to said dial, a rotary supplemental dial with indicia thereon co-operating with said fixed index to show the number or mass of similar articles on the scale, and means for operating said supplemental dial by the weighing mechanism of the scale.

2. The combination with a scale having automatic counterbalacing means and a weight scale-beam and means to indicate the weight of a load, of a counterbalanced and longitudinally adjustable balance-bar means operatively connecting the latter with the ordinary scale weight-beam, an adjusting shaft operatively connected with to move said bar, a dial on said shaft, and an indicator co-operating with said dial.

3. The combination with the lever of an ordinary weighing-scale, of a counting device adapted to be detachably connected therewith and comprising a pair of oppositely movable rack-bars, one of which is adapted to carry a specimen-receiving member, the other carrying a counterweight, a manually operable pinion shaft for adjusting said rack-bars, a rotary dial, and a fixed index co-operating therewith and indicating by said dial and index the position of adjustment of said rack-bars.

4. The combination with a scale, of a counting device including an article holder connected with the mechanism thereof to determine the number of a mass of articles on the scale, said counting device comprising a pair of oppositely movable rack-bars, manually operable means for adjusting said rack-bars, a graduated dial with concentric rows of figures thereon and rotatable about the fulcrum point of the scale to indicate the position of adjustment of the rack-bars, a series of pointers adapted to be read with the dial, and suitable gearing between the manually operable means and the dial whereby relative dial movement is had upon movement of the rack-bars.

In testimony whereof, we have signed our names to this specification in the presence of two subscribing witnesses.

JOHN J. REDDICK.
ROY CHAPMAN.

Witnesses:
W. R. MORSE,
ESTHER H. TEAHON.